(12) United States Patent
Taheri et al.

(10) Patent No.: US 12,663,055 B2
(45) Date of Patent: Jun. 23, 2026

(54) ELECTRICAL CONTROLLER FOR FORCE DAMPERS

(71) Applicant: Virginia Tech Intellectual Properties, Inc., Blacksburg, VA (US)

(72) Inventors: Saied Taheri, Blacksburg, VA (US); Sheetanshu Tyagi, Blacksburg, VA (US); Yaswanth Siramdasu, Blacksburg, VA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 586 days.

(21) Appl. No.: 18/114,439

(22) Filed: Feb. 27, 2023

(65) Prior Publication Data

US 2023/0213082 A1 Jul. 6, 2023

Related U.S. Application Data

(63) Continuation of application No. 16/718,108, filed on Dec. 17, 2019, now abandoned.

(60) Provisional application No. 62/780,455, filed on Dec. 17, 2018.

(51) Int. Cl.
| | |
|---|---|
| *F16F 9/46* | (2006.01) |
| *F16F 9/34* | (2006.01) |
| *F16F 9/53* | (2006.01) |

(52) U.S. Cl.
CPC ................ *F16F 9/463* (2013.01); *F16F 9/34* (2013.01); *F16F 9/537* (2013.01); *F16F 2222/06* (2013.01); *F16F 2224/045* (2013.01)

(58) Field of Classification Search
CPC ......... F16F 9/46–469; F16F 9/34–3488; F16F 9/53–537; F16F 9/16–285; F16F 2222/06; F16F 2224/045; F16F 2230/18; F16F 15/002
See application file for complete search history.

(56) References Cited

U.S. PATENT DOCUMENTS

| | | | | |
|---|---|---|---|---|
| 4,154,461 A * | 5/1979 | Schnittger | .......... | B60G 17/0272 280/124.179 |
| 5,096,168 A * | 3/1992 | Takehara | ................ | F16F 9/185 267/152 |
| 6,752,250 B2 * | 6/2004 | Tanner | ................... | F16F 15/022 188/267.2 |
| 6,837,343 B1 * | 1/2005 | Bugaj | ....................... | F16F 9/16 188/304 |
| 7,085,636 B2 * | 8/2006 | Song | ................... | B60G 17/0152 280/5.512 |
| 9,791,017 B2 * | 10/2017 | Carcaterra | .............. | F16F 9/532 |
| 2022/0410646 A1 * | 12/2022 | Taheri | ................... | B60G 13/10 |

* cited by examiner

*Primary Examiner* — David R Morris
(74) *Attorney, Agent, or Firm* — Carin R. Miller; Lex Generalis, LLC

(57) ABSTRACT

Described herein is an electrical controller for a damper body assembly that stores a damping policy and instructions implementing a control method based on the policy. The controller can receive a sensor output and transmits a signal to alter the contribution to a damping coefficient of the damper from each fluid mass as a function of the sensor output, policy, and control method. Also described herein are methods of using the electrical controller. Also described herein are damper body assemblies that can be controlled by the electrical controller, an actuation assembly, and methods of using the same.

18 Claims, 8 Drawing Sheets

700

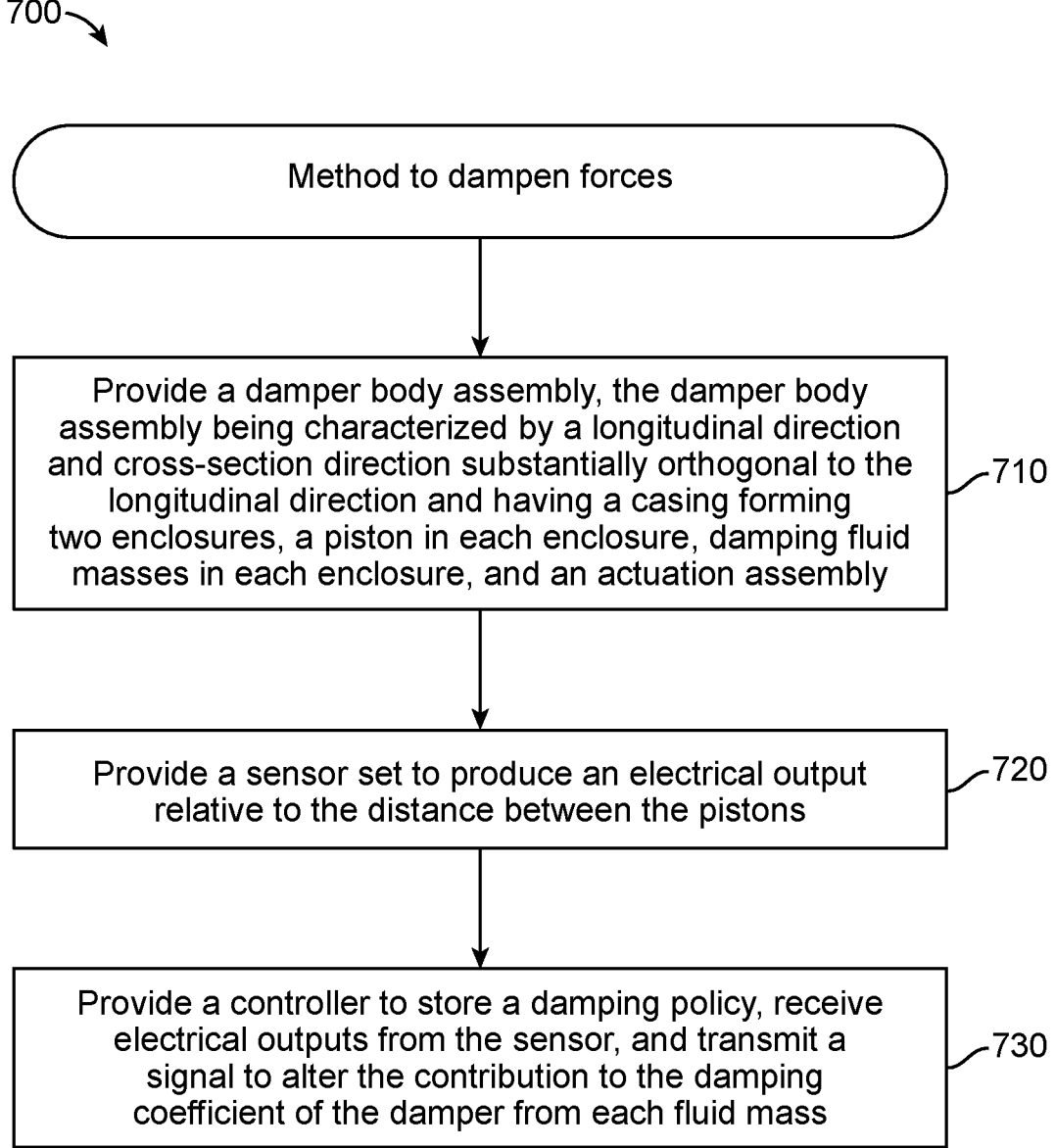

Method to dampen forces

Provide a damper body assembly, the damper body assembly being characterized by a longitudinal direction and cross-section direction substantially orthogonal to the longitudinal direction and having a casing forming two enclosures, a piston in each enclosure, damping fluid masses in each enclosure, and an actuation assembly ⌐710

Provide a sensor set to produce an electrical output relative to the distance between the pistons ⌐720

Provide a controller to store a damping policy, receive electrical outputs from the sensor, and transmit a signal to alter the contribution to the damping coefficient of the damper from each fluid mass ⌐730

FIG. 7

ELECTRICAL CONTROLLER FOR FORCE DAMPERS

CROSS REFERENCE TO RELATED APPLICATION

This application is a continuation of U.S. application Ser. No. 16/718,108 filed on Dec. 17, 2019, which claims the benefit of U.S. Provisional Patent Application No. 62/780,455 filed Dec. 17, 2018, and entitled "Novel Semi Active Suspension System for Automobiles." The complete disclosure of the above-identified priority application is hereby fully incorporated herein by reference.

TECHNICAL FIELD

The disclosed technology relates to electrical controllers for force dampers generally, for example, as used in transportation, construction, and industrial applications. Example embodiments relate to vehicle suspension systems.

BACKGROUND

A damper is a mechanical or hydraulic device designed to absorb and damp shock impulses. Dampers work by converting the kinetic energy of the shock into another form of energy (typically heat) which is then dissipated. Most shock absorbers are a form of dashpot (a damper which resists motion via viscous friction). Pneumatic and hydraulic shock absorbers typically are used in conjunction with cushions and springs. An automobile shock absorber contains spring-loaded check valves and orifices to control the flow of oil through an internal piston.

SUMMARY

The technology disclosed herein includes systems (some including computer program products) and methods for force damping. The controller is in electrical communication with a sensor set and an actuation assembly. The controller includes a storage device and a processor. The storage device stores a damping policy and application code instructions implementing a control method based on the damping policy. The processor is communicatively coupled to the storage device, and executes the instructions to cause the system to: receive the sensor set electrical output; and transmit a signal to alter the contribution to the damping coefficient of the damper from each fluid mass as a function of the received sensor set electrical output, the damping policy, and the control method.

In some examples, the damping policy comprises a sky-hook policy for the first fluid mass and a ground hook policy for the second fluid mass; while in others, the damping policy allows selective application of either policy in real time. In some examples, the control method is a Lyapunov control method. In some examples, the damper body assembly comprises one of a mono-tube and the two mechanically-serial damping fluid mass enclosures are separated by a wall in the cross section direction.

Damper systems of the technology disclosed herein include a damper body assembly, a set of sensors, an actuation assembly, and a controller. The damper body assembly is characterized by a longitudinal direction and cross-section direction substantially orthogonal to the longitudinal direction. The damper body assembly includes a casing, a first piston and a second piston, along with a first damping fluid mass and second damping fluid mass. The casing forms therein two mechanically-serial damping fluid mass enclosures. The first piston and the second piston are each housed in a separate one of the enclosures, form therethrough at least one aperture, and are each movable along the longitudinal direction within the separate enclosure in response to force on each piston. The first damping fluid mass fills the vacant volume of the first enclosure, and the second damping fluid mass fills the vacant volume of the second enclosure.

The set of sensors are operative to produce an electrical output relative to the distance between the pistons. The actuation assembly is operable, upon receiving electrical control signals, to independently alter the contribution to a damping coefficient of the damper from each fluid mass as a function of the received electrical control signals.

In some examples, each damping fluid mass is a hydraulic fluid. In such examples the actuation assembly includes at least one actuation assembly valve, and is operable to independently alter the contribution to the damping coefficient of the damper from the first fluid mass and from the second fluid mass as a function of the received electrical control signals using the at least one actuation assembly valve to vary an aggregate aperture between a compression chamber on first side of each piston and a rebound chamber on a second side of each piston. In some such examples, the actuation assembly is external to the damper body assembly, altering the contribution to the damping coefficient comprises controlling the flow of damping fluid between a compression chamber on first side of each piston and a rebound chamber on a second side of each piston through an alternate fluid path external to the casing. In other such examples, the actuation assembly is internal to the damper body assembly; and altering the contribution to the damping coefficient comprises controlling the flow of damping fluid between a compression chamber on first side of each piston and a rebound chamber on a second side of each piston through an alternate fluid path internal to the casing.

In some examples, each damping fluid mass is a magneto-rheological fluid; and the actuation assembly: includes at least one magnetic field generator; and is operable to independently alter the contribution to the damping coefficient of the damper from the first fluid mass and from the second fluid mass as a function of the received electrical control signals using the magnetic field generator to change the orientation of particles in the magneto-rheological fluid.

In some examples, each damping fluid mass is an electro-rheological fluid; and actuation assembly: includes at least one electric field generator; and is operable to independently alter the contribution to the damping coefficient of the damper from the first fluid mass and from the second fluid mass as a function of the received electrical control signals using the electric field generator to change the damping coefficient of the electro-rheological fluid.

BRIEF DESCRIPTION OF THE DRAWINGS

FIG. 7 is a block flow diagram depicting a method to dampen forces, in accordance with examples of the technology disclosed herein.

DETAILED DESCRIPTION OF EXAMPLE EMBODIMENTS

Figure 1:
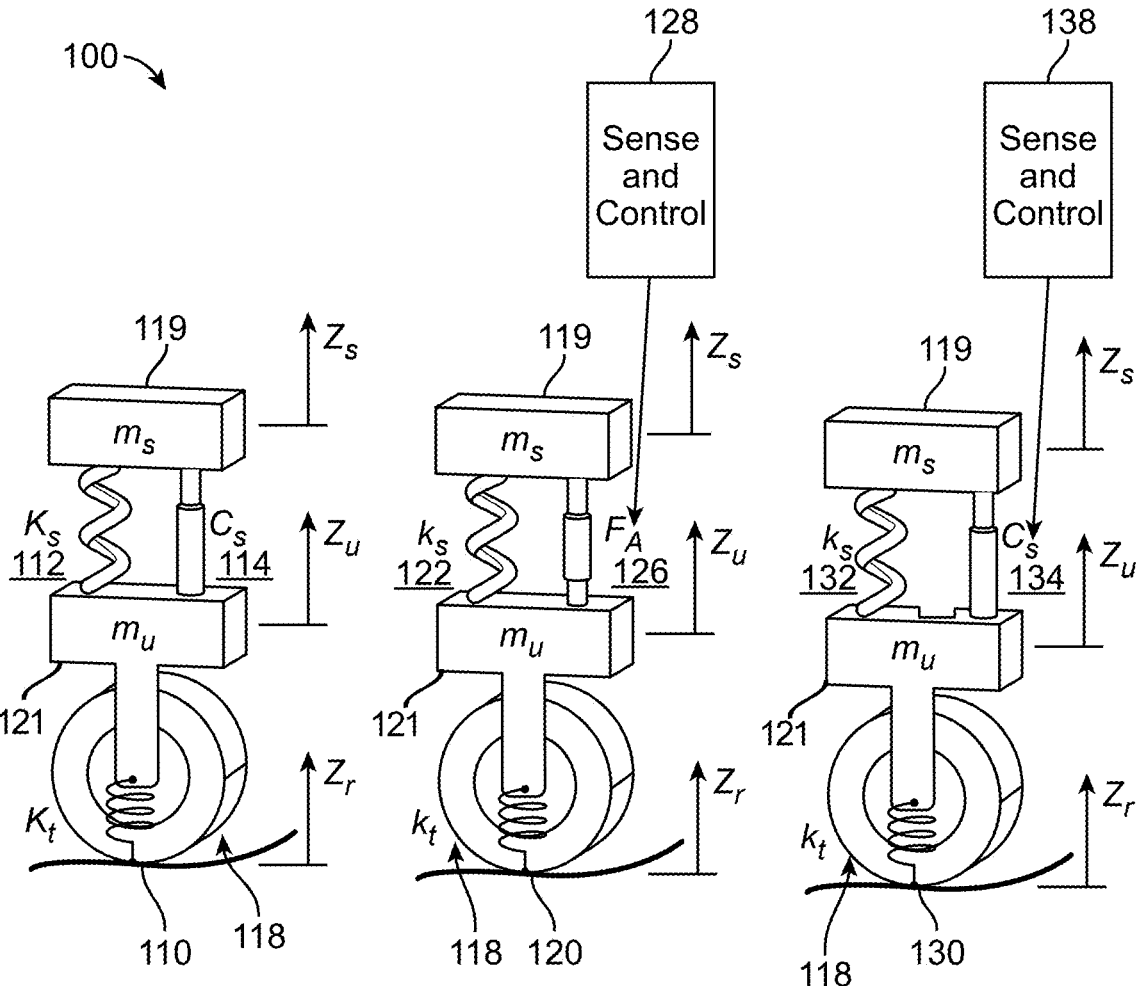
FIG. 1 presents a simplified representation 100 of suspension systems by type of controllability.

Most vehicle suspension systems consist of a damper (e.g., a shock absorber), springs, and a set of linkages. The three parts of the suspension system are responsible for controlling the resultant absolute acceleration and relative displacement. Each of these elements has their own primary purpose within the suspension system; the springs provide energy storage by providing stiffness, the damper provides energy dissipation as a function of its damping coefficient, and the linkages provide mechanical constraints on the suspension system motion. FIG. 1 presents a simplified representation 100 of suspension systems by type of controllability: passive 110, active 120, and semi-active 130. Under each type of control, the tire, wheel, and other elements of the wheel assembly 118 are represented by un-sprung-mass $m_u$ 121 and a spring with spring constant $k_r$. While FIG. 1 uses Z for the primary direction of suspension system travel, subsequent figures herein use X.

Passive suspension systems 110 in vehicles typically include some type of spring 112 and damper 114, but neither are under real time control. The spring 112 and damper 114 are characterized by a fixed (or possibly selectable) spring stiffness $k_s$ and damping coefficient Cs, respectively. Generally, softer dampers 114 provide a more comfortable ride, while stiffer dampers 114 provide better stability and thus better road handling. Manufacturers have tried building parametric designs where progressive springs and manually adjustable damping is used, but even these suffer from the drawbacks that conventional systems have. Modern passive dampers 114 allow the user to have real time control by manually adjusting a lever that changes the orifice area available for a damping fluid to pass from one side of a piston to another within the damper 114.

One concern in suspension system design and control is that achieving improvement in ride comfort and road handling at the same time poses a challenge, because these objectives conflict with each other in part due to the very characteristic of passive damper design. The almost ubiquitous use of passive suspension systems within most automobiles stems from their design simplicity and reliability and their low associated manufacturing cost. Thus, these factors make them attractive relative to more advanced suspension systems.

In an active suspension 120, in addition to springs 122 characterized by spring stiffness $k_s$, the system uses an active force $F_A$ introduced to the suspension by means of hydraulic or electric actuators 126, between the sprung mass $m_s$ 121 (e.g., the portion of the vehicle weight supported by wheel assembly 118) and un-sprung-mass $m_u$ 119 of the wheel assemblies 118 under some sort of control 128 (typically sensor-based electronic control). Typical active suspension systems 120 can sense the input being obtained from the road profile, and apply a reactive force $F_A$ as a response. Typically, active suspension systems 120 require a larger amount of power than other types of suspension systems and are comparatively more expensive.

Semi-active suspension systems 130 are electro-mechanical systems employing springs 132 and a damper 134 with the capability to vary the amount of energy that the damper 134 dissipates by controlling the damping coefficient cs of the damper 134 via a sense and control subsystem 138— typically using a small source of power. For example, varying the input voltage or current to a semi-active damper 134 creates change in performance by changing the damping coefficient cs of the damper 134, not by applying force as in active suspension systems. Semi-active suspension systems can be viewed as a compromise between the active suspension systems 120 and passive suspension systems 110 in that semi-active suspension systems allow a variation in the damping properties of the suspension system but do not require a force input into the suspension system.

As mentioned above, conventional systems face the competing objectives of seeking ride comfort and vehicle handling. Passive suspension systems have not been shown to satisfactorily consider both objectives. Automatic suspension systems that attempt to address both are less reliable than, and substantially more expensive than, passive systems.

The technology disclosed herein presents a novel semi-active double damper that, as part of a suspension system, can deliver better suspension system performance than either passive systems or known semi-active systems without the complexity and expense of automatic systems. While the examples are presented herein in the context of a conventional vehicle suspension system, the disclosed technology finds use in not only vehicle suspensions, but also seat suspensions, construction, and other industrial applications where the damping of forces (especially in the face of competing objectives) is desired.

Figure 2:
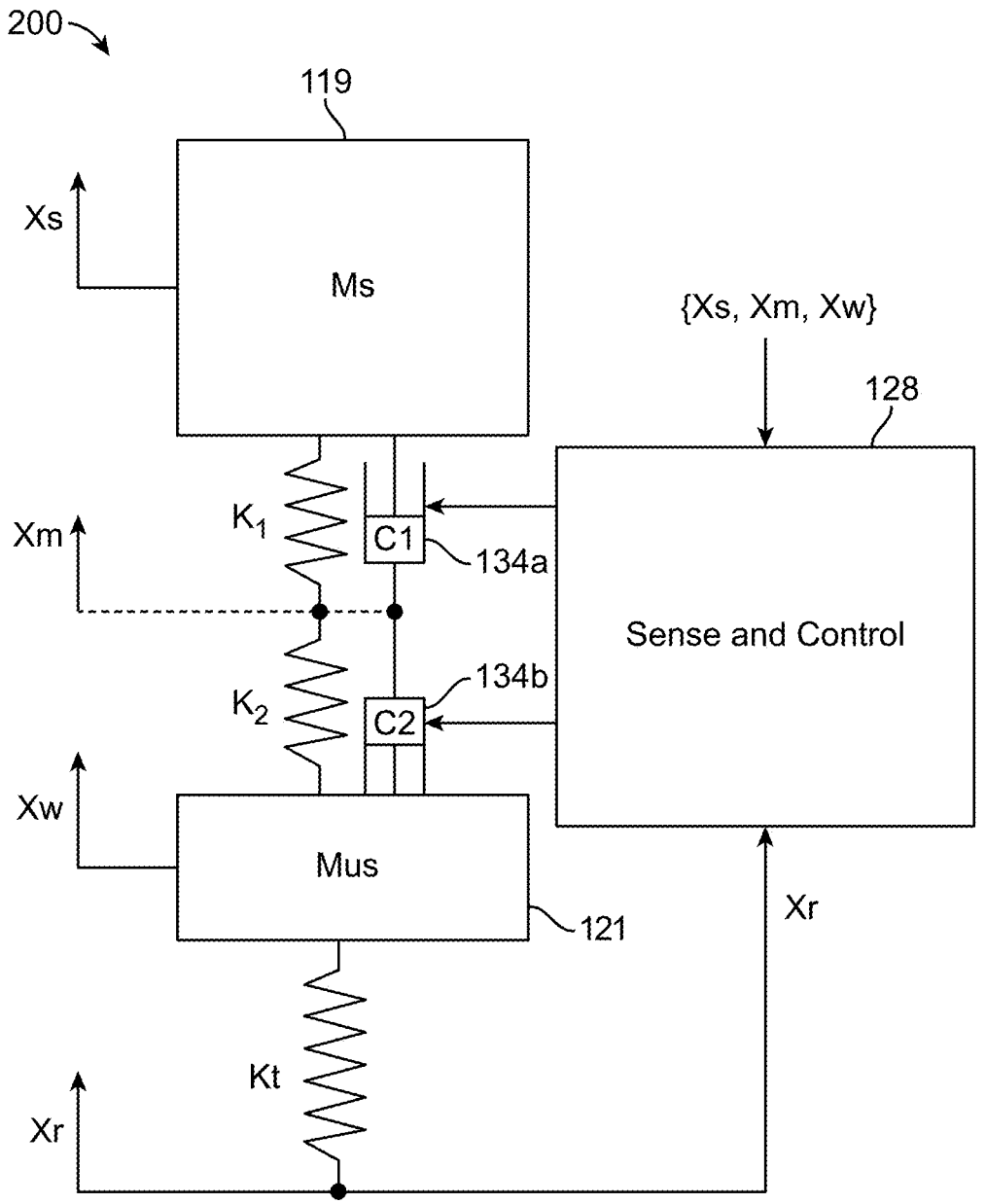
FIG. 2 is a schematic diagram of a semi-active double damper in a suspension system 200, in accordance with examples of the technology disclosed herein.

Referring to FIG. 2, and continuing to refer to FIG. 1 for context, a schematic diagram of a semi-active double damper in a suspension system 200 is shown, in accordance with examples of the technology disclosed herein. The illustrated suspension system 200 schematic represents the vehicle wheel assembly by the "un-sprung" mass $M_{us}$ 119 and the spring constant $K_r$; while the position of the road is represented by $X_r$ (and over distance as the "road profile"). The position of the un-sprung mass 121 is represented by $X_w$. The proportion of the mass of the vehicle borne by the suspension system 200 is represented by the sprung mass $M_s$ 121, and the position of the sprung mass 119 is represented by $X_s$. The suspension system 200 spring is represented collectively by spring constants $K_1$ and $K_2$; while a reference position is represented by $X_m$.

The semi-active double damper itself is represented collectively by a sense and control subsystem 128, an upper damper 134a having a controllable damping coefficient $C_1$, and a lower damper 134b having a controllable damping coefficient $C_2$. While shown as receiving the road profile and $\{X_s, X_m, X_w\}$, in practice the sense and control subsystem 128 can receive signals indicating a function of those variables, for example, acceleration; or can derive or estimate one or more of the variables, such as $X_m$.

Figure 3:
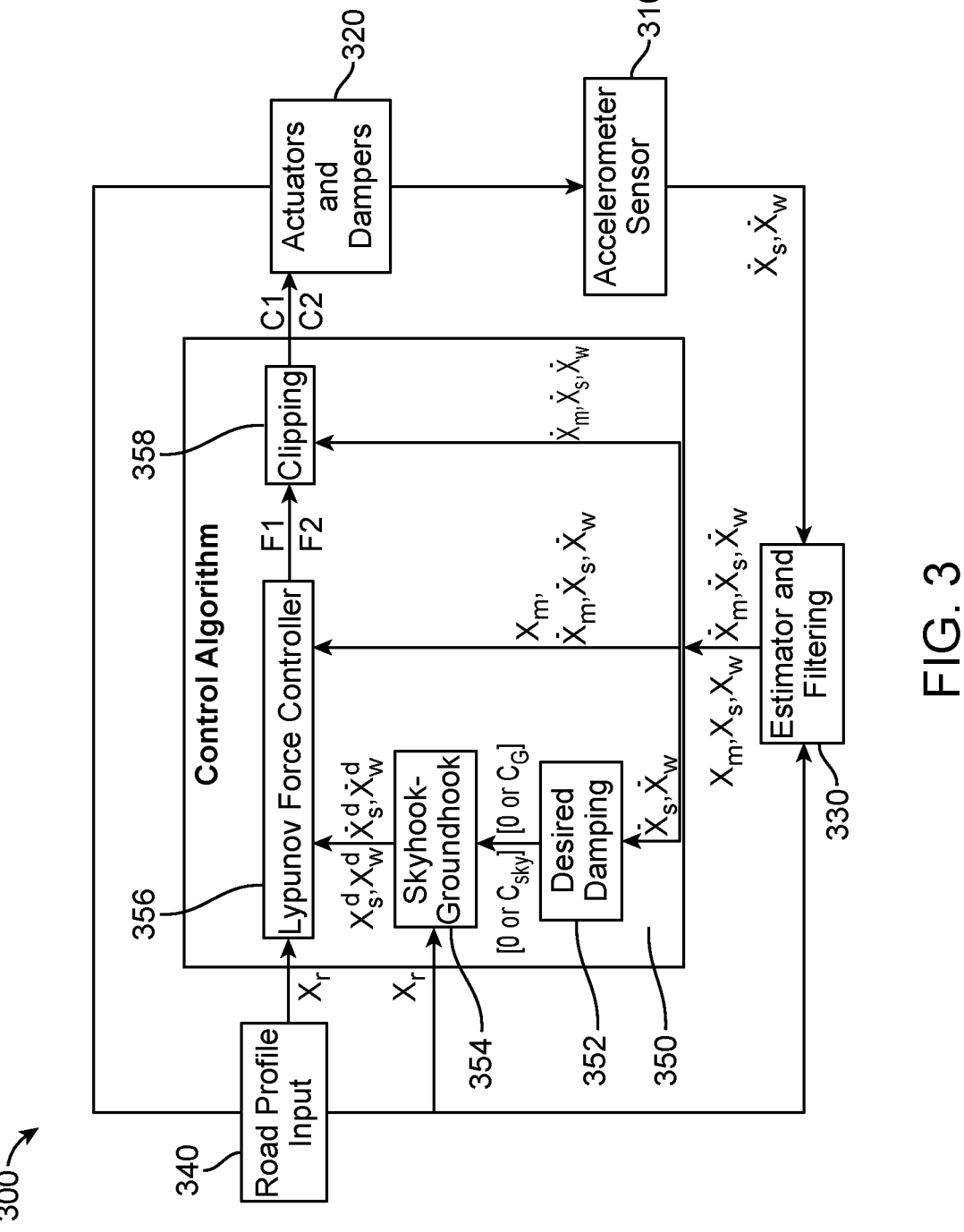
FIG. 3 is a schematic diagram of a sense and control subsystem in its context, in accordance with examples of the technology disclosed herein.

Referring to FIG. 3, and continuing to refer to prior figures for context, a schematic diagram of a sense and control subsystem in its context 300 is shown, in accordance with examples of the technology disclosed herein. In embodiments based on this sense and control subsystem, accelerometer sensors 310 provide a measure of acceleration $$\ddot{X}_w$$

of the un-sprung mass 121 and the acceleration $$\ddot{X}_{s\prime}$$

of the sprung mass 119. Note that FIG. 3 shows the accelerometer sensors 310 in physical communication with the actuators and dampers 320, and shows the actuators and dampers 320 in physical communication with the physical road profile 340.

The estimator and filtering block 330, using information from the road profile input 340 and sensed accelerations, estimates velocity $$\dot{X}_{m\prime}$$

of a separator between fluid mass enclosures of the double damper and velocity $$\dot{X}_{s\prime}$$

of the sprung mass 119 and determines the velocity $$\dot{X}_W$$

of the un-sprung mass 121. The estimator and filtering block 330 also estimates the position of the wall $X_m$, and the position of the sprung mass 119 $X_{s\prime}$, along with determining the position of the un-sprung mass 121 $X_w$.

The above determined and estimated quantities are used as inputs to the overall control algorithm 350. The control algorithm 350 includes a desired damping function 352 that chooses whether to apply a skyhook or ground hook policy to the damper based on the instantaneous determined positions and velocities. TABLE 1 represents once such desired damping function 352.

TABLE 1

$$[X_1\ X_2\ X_3\ X_4] = [X_s\ \dot{X}_s\ X_w\ \dot{X}_w]$$

$$C_{sky} = \begin{cases} C_{sky} & \text{if } (X_2 - X_4)X_2 \geq 0 \\ 0 & \text{if } (X_2 - X_4)X_2 < 0 \end{cases}$$

$$C_G = \begin{cases} C_G & \text{if } (X_4 - X_2)X_4 \geq 0 \\ 0 & \text{if } (X_4 - X_2)X_4 < 0 \end{cases}$$

The desired damping function 352 results supply a sky-hook/ground hook policy function 354, which along the road profile input 340 create input data set $$\{X_{s\prime}^d, X_W^d, \dot{X}_{s\prime}^d, \dot{X}_W^d\}$$

for a force controller function 356 per the equations of TABLE 2. In some examples of the technology disclosed herein, the damping policy applies a skyhook policy for one of the serial dampers and a ground hook policy for the other.

TABLE 2

$$I\begin{bmatrix} \dot{X}_1^d \\ \dot{X}_2^d \\ \dot{X}_3^d \\ \dot{X}_4^d \end{bmatrix} + \begin{bmatrix} 0 & -1 & 0 & 0 \\ \dfrac{K_s}{M_s} & \dfrac{C_{sky}}{M_s} & -\dfrac{K_s}{M_s} & 0 \\ 0 & 0 & 0 & -1 \\ -\dfrac{K_s}{M_{us}} & 0 & \dfrac{K_s + K_t}{M_{us}} & \dfrac{C_G}{M_{us}} \end{bmatrix}\begin{bmatrix} X_1^d \\ X_2^d \\ X_3^d \\ X_4^d \end{bmatrix} + \begin{bmatrix} 0 \\ 0 \\ 0 \\ -\dfrac{K_t X_r}{M_{us}} \end{bmatrix} = 0$$

Force controller 356 uses both the output of the skyhook/ground hook policy function 354 and estimator and filtering block 330 outputs $$\{\dot{X}_m, \dot{X}_{S\prime}, \dot{X}_W, X_{m\prime}\}$$

to determine variables $F_1$ and $F_2$ that directly relate to the signal to be sent to the damper 134. TABLE 3 illustrates the equations governing the force controller 356 in this respect.

TABLE 3

$$F_1 = \dot{X}_2^d + \left(K_1 X_1^d + C_1 X_2^d - C_1 \dot{X}_m - K_1 X_m\right)\hat{p}_1 - K_{p2}\left(X_2 - X_2^d\right)$$

$$F_2 = \dot{X}_4^d + \frac{(K_2 + \hat{p}_2)X_3^d + C_2 X_4^d - \left(C_2 \dot{X}_m + K_2 X_m + \hat{p}_2 X_r\right)}{M_{us}} - K_{p4}\left(X_4 - X_4^d\right)$$

In the example of FIG. 3 and TABLE 3, the force controller 356 is a Lyapunov controller. Lyapunov's method allows determination the stability of the suspension system without explicitly integrating a differential equation. The method is a generalization of the idea that if there is some "measure of energy" in a system, the rate of change of the energy of the system can be measured to ascertain stability. Other control methods that can be used include, but are not limited to: Sliding Mode Control, Adaptive Control, Fuzzy Logic, H-Infinity, proportional-integral-derivative (PID), Acceleration Driven Damper (minimizes vertical acceleration of sprung mass by adjusting the damping coefficient), and Power Driven Damper (controls the energy stored and the power dissipated in a semi-active suspension; the results are comparable to those of ADD but the chattering effect of the control input is resolved to some extent).

As a practical matter, regardless of the calculated forces, the damper 134 can only present a certain maximum amount of damping, so some examples of the disclosed technology use a clipping function 358 to prevent saturation of the actuators and dampers 320. TABLE 4 illustrates the equations governing the clipping function 358.

TABLE 4

$$F_1 = \begin{cases} F_1 & \text{if } \left(X_2 - \dot{X}_m\right)F_1 \leq 0 \\ F_{1,min} & \text{if } \left(X_2 - \dot{X}_m\right)F_1 > 0 \end{cases}$$

$$F_2 = \begin{cases} F_2 & \text{if } \left(X_4 - \dot{X}_m\right)F_2 \leq 0 \\ F_{2,min} & \text{if } \left(X_4 - \dot{X}_m\right)F_2 > 0 \end{cases}$$

TABLE 4-continued $$F_{i,min} \leq F_i \leq F_{i,max}, i = 1, 2$$

$$F_{1,min} = C_{1,min}(X_2 - \dot{X}_m)\hat{p}_1, F_{1,max} = C_{1,max}(X_2 - \dot{X}_m)\hat{p}_1,$$

$$F_{2,min} = \frac{C_{2,min}(\dot{X}_m - X_4)}{M_{us}}, F_{2,max} = \frac{C_{2,max}(\dot{X}_m - X_4)}{M_{us}}$$

Figure 4:
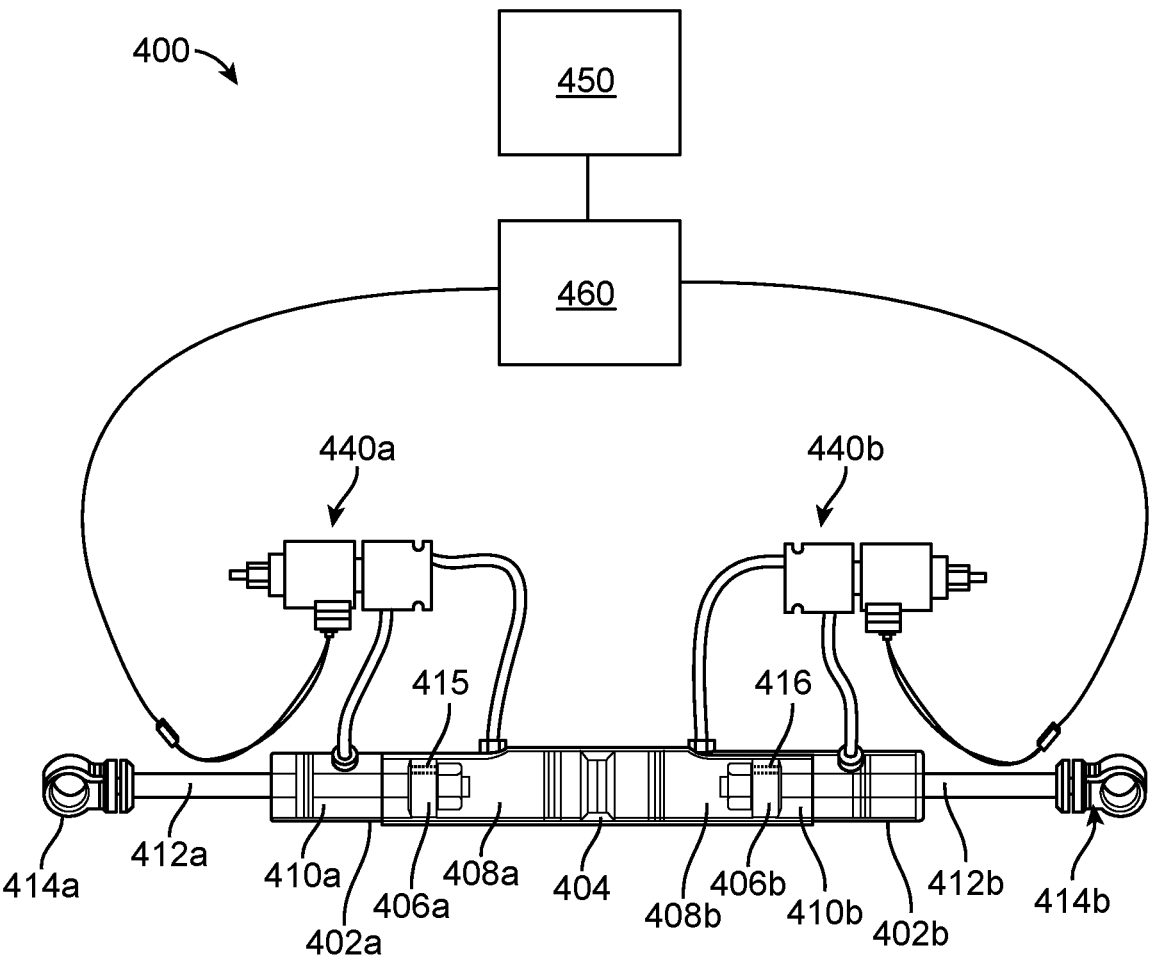
FIG. 4 illustrates a prototype semi-active double damper, in accordance with examples of the technology disclosed herein.

Referring to FIG. 4, and continuing to refer to prior figures for context, a prototype semi-active double damper 400 is illustrated, in accordance with examples of the technology disclosed herein. The damper 400 is characterized by a longitudinal direction and cross-section direction substantially orthogonal to the longitudinal direction. The damper 400 includes a damper body assembly that comprises two mono-tube shock absorber casings 402a, 402b, end-to-end inside an aluminum sleeve 404. In some examples, individual twin-tube shocks can be used.

Collectively the casings 402a and 402b form two separate mechanically-serial damping fluid mass enclosures. Each enclosure houses a piston 406a, 406b that defines a compression chamber 408a, 408b and a rebound chamber 410a, 410b in the respective casing to either side of the respective piston. Each piston 406a, 406b has formed therethrough at least one aperture, such as aperture 415 and aperture 416. Each piston 406a, 406b is driven and recovered relative to the respective chamber by a piston rod 412a, 412b in response to force translated from a respective eyelet 414a, 414b.

A first damping fluid mass (not directly shown) fills the vacant volume of a first of the enclosures, and a second damping fluid mass (also not directly shown) fills the vacant volume of a second of the enclosures. In the present example, the fluid is a conventional hydraulic fluid. In other example embodiments, the fluid is a magneto-rheological (MR) fluid or an electro-rheological (ER) fluid. In such other embodiments the actuation assembly directly controlling the damping coefficient of the damper is different than that described herein for conventional hydraulic fluid, e.g., a magnetic field generator for MR fluid, and an electric field generator for ER fluid.

A set of sensors 450 can be accelerometers as described in connection with FIG. 4 above, or can be other such sensors where characteristics related to the relative position of each piston 402 or each eyelet 414 can be sensed. The set of sensors are operative to produce an electrical output relative to the distance between the pistons 402a, 402b or some other reference positions that are related to the forces experienced by the sprung mass 119 and the un-sprung mass 121.

Actuators 440a, 440b, form an actuation assembly that is operable, upon receiving electrical control signals, to independently alter the contribution to a damping coefficient of the damper from each fluid mass as a function of the received electrical control signals received from controller 460 (as described above in connection with FIG. 3). In the example of FIG. 4, each actuator 440a, 440b is a solenoid valve controlling a path (in FIG. 4, through hoses) alternate to the one or more apertures 415, 416 in each piston 406a, 406b allowing the fluid mass to flow between the respective compression chamber 408a, 408b and rebound chambers 410a, 410b. That is, some fluid mass may flow through the one or more apertures 415, 416 while additional fluid mass may flow through the actuator 440a, 440b at a controllable rate.

The controller 460 is in electrical communication with the sensor set 450 and the actuation assembly 440a, 440b. The controller includes a storage device (not shown separately) storing a damping policy (e.g., as described above with respect to FIG. 3) and application code instructions (not shown separately) implementing a control method based on the damping policy (also as described above with respect to FIG. 3. The controller 460 further includes a processor communicatively coupled to the storage device, wherein the processor executes the application code instructions to cause the system to receive the sensor set 450 electrical output, and transmit a signal to alter the contribution to the damping coefficient of the damper 400 from each fluid mass as a function of the received sensor set electrical output, the damping policy, and the control method.

Specifically, the controller 460 is operable to independently alter the contribution to the damping coefficient of the damper from the first fluid mass and from the second fluid mass as a function of the received electrical control signals using the each actuation assembly 440 valve to vary an aggregate aperture between a compression chamber 408 on first side of each piston and a rebound chamber 410 on a second side of each piston 406. The controller 460 alters the contribution to the damping coefficient by controlling the alternate fluids path external to the casing.

Figure 5:
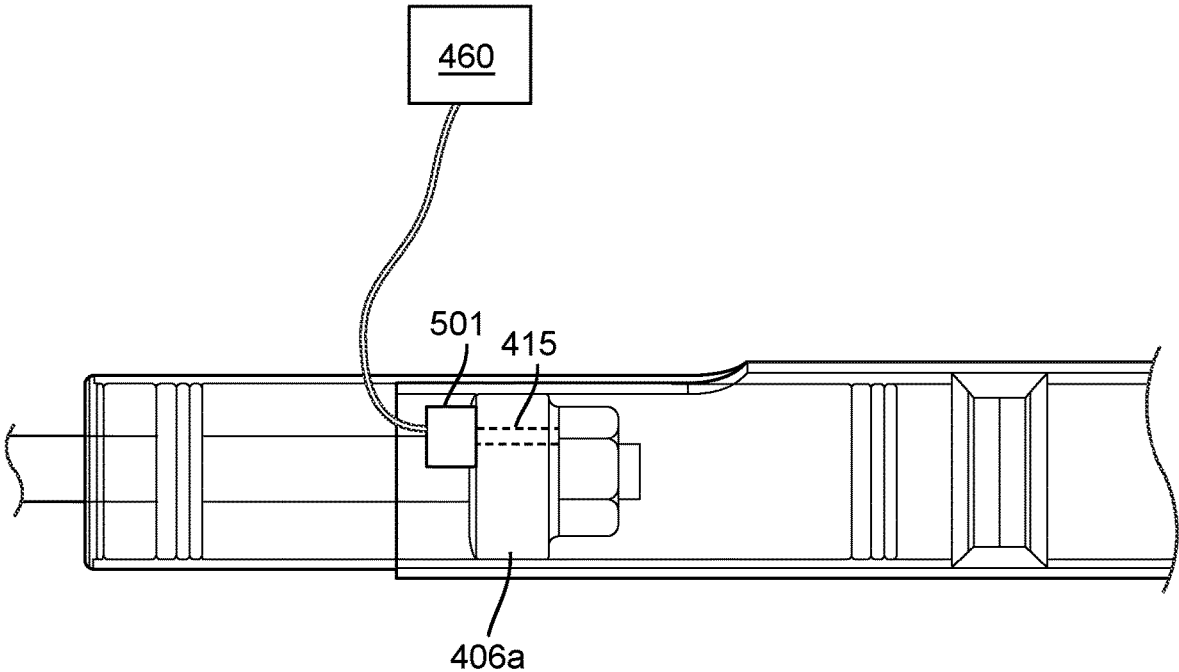
FIG. 5 illustrates a portion of a prototype semi-active double damper with an internal actuation assembly, in accordance with examples of the technology disclosed herein.

FIG. 5 illustrates a portion of a prototype semi-active double damper with an internal actuation assembly 501, in accordance with examples of the technology disclosed herein. In some other embodiments employing conventional hydraulic fluid, the actuation assembly 501 is internal to the damper casing, for example a rotary stepper motor controlling a stack of aperture discs.

The internal actuation assembly 501 performs a similar function as the actuation assembly 440a and 440b as described in FIG. 4. In an example, an internal actuation assembly 501 is affixed to both pistons 406a and an internal actuation assembly 501 is affixed to piston 406b. The internal actuation assembly 501 may control the size of the opening of the orifice 415. Similarly, a second internal actuation assembly 501 on the piston 406b may control the size of the orifice 416. In an example in which the internal actuation assembly 501 is a rotary stepper motor, the controller 460 alters the contribution to the damping coefficient by controlling the alignment of the discs in each fluid mass enclosure internal to the casing. The alignment of the discs changes the size of the orifice 415, which allows more fluid mass to flow between the compression chamber 408a and rebound chamber 410a.

In certain embodiments, the controller 460 is also internal to the damper casing. While the damper of FIGS. 4 and 5 are disclosed herein as a mono-tube design, other embodiments of the technology disclosed herein employ a twin-tube design.

Figure 6:
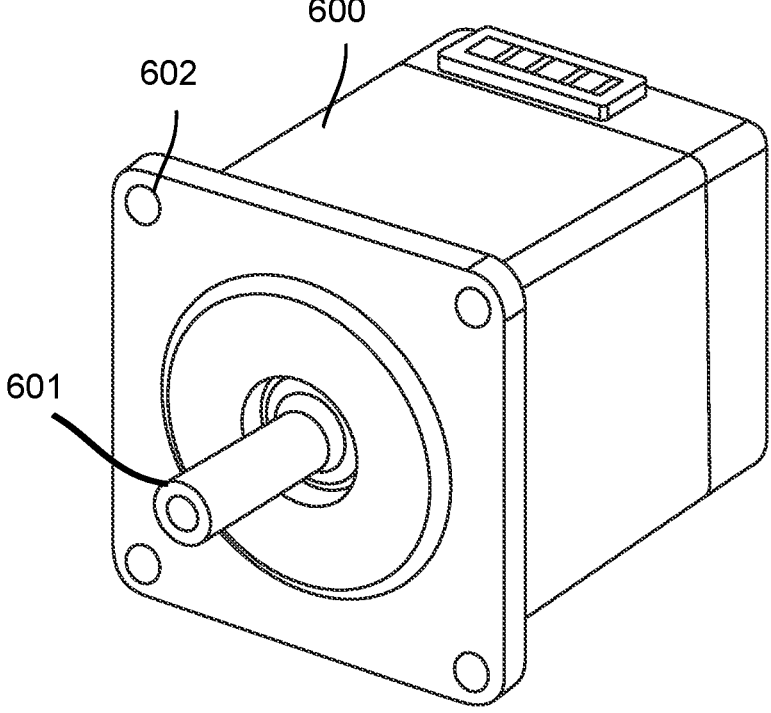
FIG. 6 illustrates an example rotary stepper motor, in accordance with examples of the technology disclosed herein.

FIG. 6 illustrates an example rotary stepper motor 600, in accordance with examples of the technology disclosed herein. The rotary stepper motor 600 is an example that may be used as the internal actuation assembly 501. The rotary stepper motor 600 may receive a signal from a controller 460 and turn the shaft 601 or perform any other suitable mechanical task to open the aperture 415 to a larger or smaller size. The shaft 601, when turned, may move the aperture discs such that the entrance to the aperture 415 is made larger or smaller. For example, different aperture discs may have different apertures and when each aperture disc is inserted inline with the aperture 415, then the size of the current aperture disc is larger or smaller. The fluid flow through the aperture 415 is increased or decreased respectively.

The rotary stepper motor 600 may be connected to the piston 406*a* via the screwed fittings 602 or via any other suitable mechanism.

FIG. 7 is a block flow diagram depicting a method 700 to dampen forces, in accordance with examples of the technology disclosed herein.

In block 710, a user or operator provides a damper body assembly, the damper body assembly being characterized by a longitudinal direction and cross-section direction substantially orthogonal to the longitudinal direction and having a casing forming two enclosures, a piston in each enclosure, damping fluid masses in each enclosure, and an actuation assembly. The damper body assembly has a longitudinal direction and cross-section direction substantially orthogonal to the longitudinal direction.

The provided damper body assembly includes a casing forming therein two mechanically-serial damping fluid mass enclosures, as described herein. The damper body assembly has a first piston and a second piston. Each of the pistons are housed in a separate one of the enclosures, forming therethrough at least one aperture, and movable along the longitudinal direction within the separate enclosure in response to force on each piston. The damper body assembly has a first damping fluid mass filling the vacant volume of a first of the enclosures, and a second damping fluid mass filling the vacant volume of a second of the enclosures. The damper body assembly has an actuation assembly. The actuation assembly, upon receiving electrical control signals, is operable to independently alter the contribution to a damping coefficient of the damper from each fluid mass as a function of the received electrical control signals.

In block 720, the user or operator provides a sensor set to produce an electrical output relative to the distance between the pistons.

In block 730, the user or operator provides a controller to store a damping policy, receive electrical outputs from the sensor, and transmit a signal to alter the contribution to the damping coefficient of the damper from each fluid mass. The provided controller includes a storage device storing a damping policy and application code instructions implementing a control method based on the damping policy, and a processor communicatively coupled to the storage device. The provided controller executes the application code instructions to cause the controller to receive an electrical output from the sensor set and transmit a signal to alter the contribution to the damping coefficient of the damper from each fluid mass as a function of the received sensor set electrical output, the damping policy, and the control method.

The user or operator may employ the method 500 to affix the damper body assembly to a vehicle or other device requiring a dampening of forces. The damper body assembly may be installed on the device and logically or physically connected to an existing controller of the device. Alternatively, the damper body assembly may be installed with a new controller. The new controller may be a part of the damper body assembly or may be a separate assembly component.

The damper body assembly may be installed on the device and logically or physically connected to an existing sensor set of the device. Alternatively, the damper body assembly may be installed with a new sensor set. The new sensor set may be a part of the damper body assembly or may be a separate assembly component.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the scope of the following claims, which are to be accorded the broadest interpretation so as to encompass such alternate embodiments.

Figure 8:
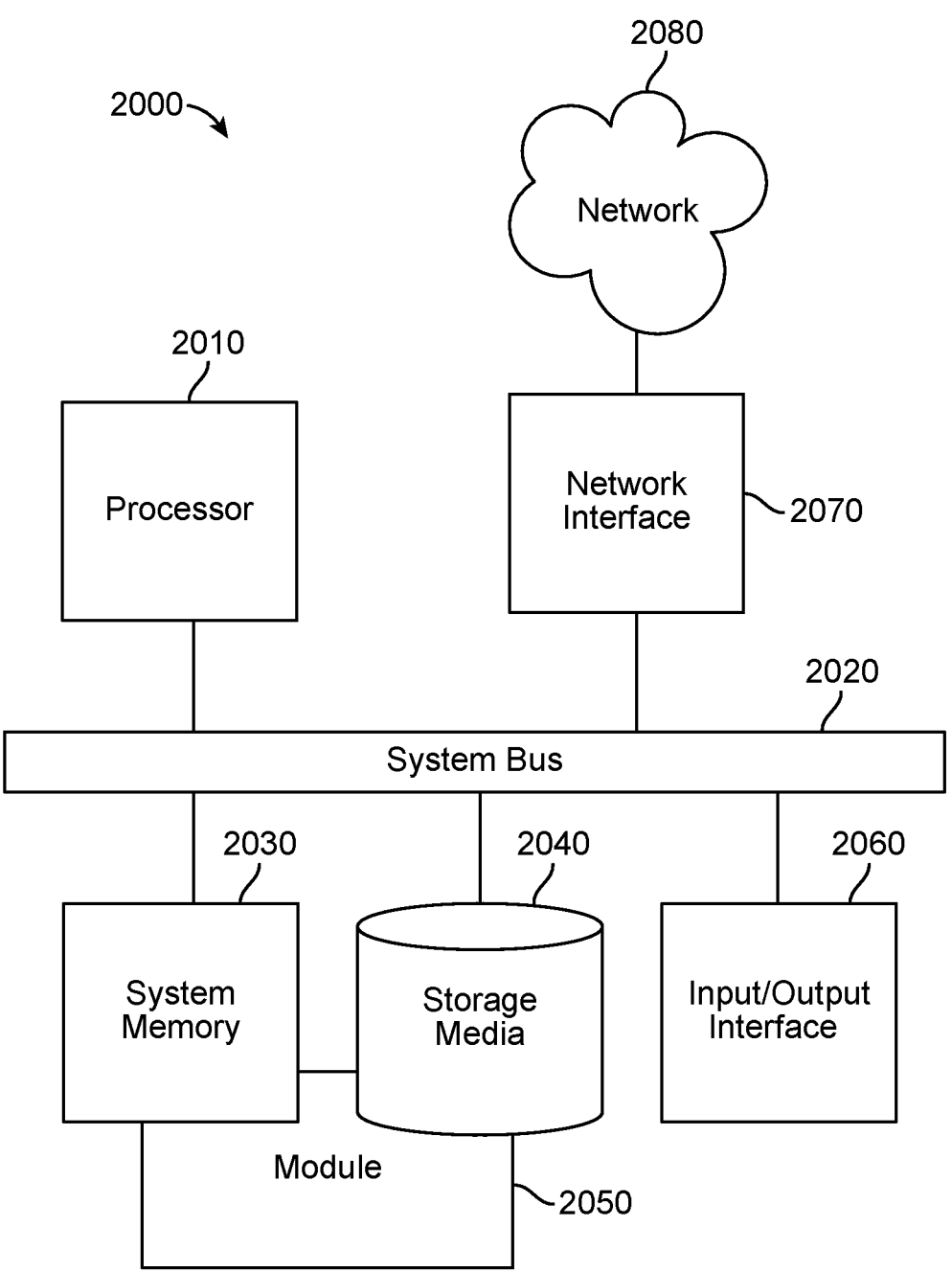
FIG. 8 is a diagram depicting a computing machine and a module, in accordance with certain example embodiments.

FIG. 8 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components, for example, a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor (DSP), an application specific integrated circuit (ASIC), a graphics processing unit (GPU), a field programmable gate array (FPGA), a programmable logic device (PLD), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories, for example, read-only memory (ROM), programmable read-only memory (PROM), erasable programmable read-only memory (EPROM), flash memory, or any other device capable of storing program instructions or data with or without applied power. The system memory 2030 may also include volatile memories, for example, random access memory (RAM), static random access memory (SRAM), dynamic random access memory (DRAM), and synchronous dynamic random access memory (SDRAM).

Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device, for example, the storage media 2040.

The storage media 2040 may include a hard disk, a floppy disk, a compact disc read only memory (CD-ROM), a digital versatile disc (DVD), a Blu-ray disc, a magnetic tape, a flash memory, other non-volatile memory device, a solid state drive (SSD), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules, for example, module 2050, data, or any other information. The storage media 2040 may be part of, or connected to, the computing machine 2000. The storage media 2040 may also be part of one or more other computing machines that are in communication with the computing machine 2000, for example, servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits, for example, microcode or configuration information for an FPGA or other PLD.

The input/output (I/O) interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, for example, small computer system interface (SCSI), serial-attached SCSI (SAS), Fibre Channel, peripheral component interconnect (PCI), PCI express (PCIe), serial bus, parallel bus, advanced technology attached (ATA), serial ATA (SATA), universal serial bus (USB), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or analog communication media, for example, fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain example embodiments, any of the processor 2010, the other elements of the computing machine 2000, or the various peripherals discussed herein may be integrated into a single device, for example, a system on chip (SOC), system on package (SOP), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Additionally, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the scope of the following claims, which are to be accorded the broadest interpretation so as to encompass such alternate embodiments.

Some embodiments of the technology disclosed herein include a double damper which includes two independently controlled electronic dampers placed in series with another. These two interact with each other in a way that enhances the performance of a suspension system.

Although specific embodiments have been described above in detail, the description is merely for purposes of illustration. It should be appreciated, therefore, that many aspects described above are not intended as required or essential elements unless explicitly stated otherwise.

Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

We claim:

1. A controller in electrical communication with a sensor set and an actuation assembly for a damper, comprising:
   a storage device storing a damping policy and application code instructions implementing a control method based on the damping policy; and
   a processor communicatively coupled to the storage device, wherein the processor executes the application code instructions to cause the controller to:
      receive an electrical output from the sensor set on a damper body assembly, the damper body assembly comprising:
         a casing forming therein a first mechanically-serial damping fluid mass enclosure and a second mechanically-serial damping fluid mass enclosure; and
         a first piston and a second piston, each piston housed in a separate one of the first mechanically-serial damping fluid mass enclosure with a first damping fluid and the second mechanically-serial damping fluid mass enclosure with a second damping fluid, forming therethrough at least one aperture, and movable along a longitudinal direction within the first mechanically-serial damping fluid mass enclosure and the second mechanically-serial damping fluid mass enclosure in response to force on each piston;
      wherein the electrical output is relative to a distance between the first piston and the second piston; and
      transmit, to the actuation assembly, an electrical control signal to independently alter a contribution to a damping coefficient for the first damping fluid and the second damping fluid as a function of the electrical output, the damping policy, and the control method.

2. The controller of claim 1, wherein the damping policy comprises a skyhook policy for the first damping fluid and a ground hook policy for the second damping fluid.

3. The controller of claim 1, wherein the control method is a Lyapunov control method.

4. The controller of claim 1, wherein the damper body assembly comprises a single mono-tube that houses the first and the second mechanically-serial damping fluid mass enclosures that are separated by a wall extending across the single mono-tube.

5. The controller of claim 1, wherein the actuation assembly:
   comprises a first actuation assembly valve inline via first tubing between a first compression chamber on a first side of the first piston and a first rebound chamber on a second side of the first piston a second actuation assembly valve inline via second tubing between a second compression chamber on a first side of the second piston and a second rebound chamber on a second side of the second piston; and
   is operable to independently alter the contribution to the damping coefficient of the damper from the first damping fluid and from the second damping fluid as a function of the received electrical control signals to vary an aggregate aperture of each of the actuation assembly valves.

6. The controller of claim 5, wherein:
   the actuation assembly is external to the damper body assembly; and
   altering the contribution to the damping coefficient comprises controlling the flow of damping fluid between the first compression chamber on the first side of the first piston and the first rebound chamber on the second side of the first piston through a first fluid path external to the casing and controlling the flow of damping fluid between the second compression chamber on first side of the second piston and the second rebound chamber on the second side of the second piston through an second fluid path external to the casing.

7. The controller of claim 5, wherein:
   the actuation assembly is internal to the damper body assembly; and
   altering the contribution to the damping coefficient comprises controlling the flow of damping fluid between the first compression chamber on the first side of the first piston and the first rebound chamber on the second side of the first piston through the aperture in the first piston and altering the contribution to the damping coefficient comprises controlling the flow of damping fluid between the second compression chamber on the first side of the second piston and the second rebound chamber on the second side of the second piston through the aperture in the second piston.

8. The controller of claim 1, wherein the actuation assembly comprises a rotary stepper motor controlling a stack of aperture discs internal to the casing for the first damping fluid and a rotary stepper motor controlling a stack of aperture discs internal to the casing for the second damping fluid.

9. A method to dampen forces, comprising:

providing a controller in electrical communication with a sensor set and an actuation assembly for a damper;

providing a damper body assembly, the damper body assembly being characterized by a longitudinal direction and cross-section direction substantially orthogonal to the longitudinal direction, and comprising:

a casing forming therein a first mechanically-serial damping fluid mass enclosure and a second mechanically-serial damping fluid mass enclosure; and a first piston and a second piston, each piston housed in a separate one of the first mechanically-serial damping fluid mass enclosure with a first damping fluid and the second enclosure with a second damping fluid, forming therethrough at least one aperture, and movable along a longitudinal direction within the first mechanically-serial damping fluid enclosure and the second mechanically-serial damping fluid mass enclosure in response to force on each piston;

providing the actuation assembly operable, upon receiving electrical control signals, to independently alter the contribution to a damping coefficient of the damper from the first damping fluid and the second damping fluid as a function of the received electrical control signals;

receiving, by the controller and from the sensor set, a signal based on a distance between the first piston and the second piston;

communicating, by the controller, the electrical control signals to the actuation assembly based on the received signal, a damping policy, and a control method; and independently alter, by the actuation assembly, a contribution to a damping coefficient for the first damping fluid and the second damping fluid as a function of the electrical output.

10. The method of claim 9, wherein the controller comprises:

a storage device storing the damping policy and application code instructions implementing the control method based on the damping policy; and a processor communicatively coupled to the storage device.

11. The method of claim 9, wherein the control method is a Lyapunov control method.

12. The method of claim 9, wherein the damping policy comprises a skyhook policy for the first damping fluid and a ground hook policy for the second damping fluid.

13. The method of claim 12, wherein the control method is a Lyapunov control method.

14. The method of claim 9, wherein the damper body assembly comprises a single mono-tube that houses the first and the second mechanically-serial damping fluid mass enclosures that are separated by a wall extending across the single mono-tube.

15. The method of claim 9, wherein the actuation assembly:

comprises a first actuation assembly valve inline via first tubing between a first compression chamber on a first side of the first piston and a first rebound chamber on a second side of the first piston and a second actuation assembly valve inline via second tubing between a second compression chamber on a first side of the second piston and a second rebound chamber on a second side of the second piston; and is operable to independently alter the contribution to the damping coefficient of the damper from the first damping fluid and from the second damping fluid as a function of the received electrical control signals to vary an aggregate aperture of each of the first and the second actuation assembly valves.

16. The method of claim 15, wherein:

the actuation assembly is external to the damper body assembly; and altering the contribution to the damping coefficient comprises controlling the flow of damping fluid between the first compression chamber on the first side of the first piston and the first rebound chamber on the second side of the first piston through a first fluid path external to the casing and controlling the flow of damping fluid between the second compression chamber on first side of the second piston and the second rebound chamber on the second side of the second piston through a second fluid path external to the casing.

17. The method of claim 15, wherein:

the actuation assembly is internal to the damper body assembly; and altering the contribution to the damping coefficient comprises controlling the flow of damping fluid between the first compression chamber on the first side of the first piston and the first rebound chamber on a second side of the first piston through an aperture in the first piston and wherein altering the contribution to the damping coefficient comprises controlling the flow of damping fluid between the second compression chamber on first side of the second piston and the second rebound chamber on a second side of the second piston through an aperture in the second piston.

18. The method of claim 9, wherein the actuation assembly comprises a rotary stepper motor controlling a stack of aperture discs internal to the casing for the first damping fluid and a rotary stepper motor controlling a stack of aperture discs internal to the casing for the second damping fluid.

* * * * *